(12) United States Patent
Rhee et al.

(10) Patent No.: US 7,973,886 B2
(45) Date of Patent: Jul. 5, 2011

(54) FOUR COLOR LIQUID CRYSTAL DISPLAY AND PANEL THEREFOR

(75) Inventors: Young-Joon Rhee, Seoul (KR); Dong-Ho Lee, Gyeonggi-do (KR); Chung-Hyo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/474,192

(22) Filed: May 28, 2009

(65) Prior Publication Data

US 2009/0244450 A1  Oct. 1, 2009

Related U.S. Application Data

(62) Division of application No. 10/799,396, filed on Mar. 12, 2004, now Pat. No. 7,542,112.

(30) Foreign Application Priority Data

Mar. 13, 2003  (KR) .................................. 2003-15752

(51) Int. Cl.
*G02F 1/1335* (2006.01)
(52) U.S. Cl. ...................................................... 349/106
(58) Field of Classification Search .................... None
See application file for complete search history.

(56) References Cited

U.S. PATENT DOCUMENTS

| | | | |
|---|---|---|---|
| 4,704,559 A | 11/1987 | Suginoya et al. | |
| RE33,882 E | 4/1992 | Morozumi | |
| 5,585,951 A | 12/1996 | Noda et al. | |
| 5,587,819 A | 12/1996 | Sunohara et al. | |
| 5,642,178 A | 6/1997 | Leonardi et al. | |
| 5,754,261 A | 5/1998 | Lyu | |
| 5,994,721 A | 11/1999 | Zhong et al. | |
| 6,016,178 A | 1/2000 | Kataoka et al. | |
| 6,031,512 A | 2/2000 | Kadota et al. | |
| 6,081,309 A | 6/2000 | Suzuki et al. | |
| 6,365,916 B1 | 4/2002 | Zhong et al. | |
| 6,462,798 B1 | 10/2002 | Kim et al. | |
| 6,785,068 B2 | 8/2004 | Takizawa et al. | |
| 6,787,275 B2 | 9/2004 | Kawase | |
| 6,798,471 B2 | 9/2004 | Yamada | |
| 2002/0012083 A1 | 1/2002 | Tanaka et al. | |
| 2002/0074549 A1 | 6/2002 | Park et al. | |
| 2002/0145695 A1 | 10/2002 | Kim et al. | |
| 2004/0075788 A1* | 4/2004 | Cheng ........................... 349/106 |

FOREIGN PATENT DOCUMENTS

| | | |
|---|---|---|
| CN | 1354383 | 6/2002 |
| CN | 1354383 A | 6/2002 |
| JP | 05-021235 U | 3/1993 |
| JP | 05-232309 A | 9/1993 |
| JP | 06-095053 | 4/1994 |
| JP | 06-301057 | 10/1994 |
| JP | 08-122824 | 5/1996 |
| JP | 09-311347 | 12/1997 |
| JP | 10-010517 | 1/1998 |
| JP | 10-186412 | 7/1998 |

(Continued)

*Primary Examiner* — Lucy P Chien
(74) *Attorney, Agent, or Firm* — Innovation Counsel LLP

(57) ABSTRACT

Thin film transistors are formed on a lower substrate, and red, green, blue and transparent color filters are formed thereon. An organic insulating layer is formed on the color filters, and pixel electrodes are formed thereon. A black matrix and a common electrode are formed on an upper substrate facing the lower substrate.

22 Claims, 2 Drawing Sheets

FOREIGN PATENT DOCUMENTS

| | | |
|---|---|---|
| JP | 11-002810 | 1/1999 |
| JP | 11-024061 | 1/1999 |
| JP | 11-212060 | 8/1999 |
| JP | 11-295717 | 10/1999 |
| JP | 11-295717 A | 10/1999 |
| JP | 11337926 | 12/1999 |
| JP | 2000-137242 | 5/2000 |
| JP | 2000-147239 | 5/2000 |
| JP | 2000-162590 | 6/2000 |
| JP | 2000-187209 | 7/2000 |
| JP | 2000-250066 | 9/2000 |
| JP | 2000-330102 | 11/2000 |
| JP | 2001-083522 A | 3/2001 |
| JP | 2001-091721 A | 4/2001 |
| JP | 2001-117085 | 4/2001 |
| JP | 2001-142095 | 5/2001 |
| JP | 2001-174824 | 6/2001 |
| JP | 2001-202033 | 7/2001 |
| JP | 2001-281697 | 10/2001 |
| JP | 2001-296523 | 10/2001 |
| JP | 2002-006303 | 1/2002 |
| JP | 2002-006303 A | 1/2002 |
| JP | 2002-005350 | 2/2002 |
| JP | 2002-040485 | 2/2002 |
| JP | 2002-296618 | 10/2002 |
| KR | 1994-0003057 | 2/1994 |
| KR | 1019990034037 | 5/1999 |
| KR | 1999-0084316 | 12/1999 |
| KR | 100268308 B1 | 7/2000 |
| KR | 10-2000-0059637 | 10/2000 |
| KR | 10-2001-0001362 | 1/2001 |
| KR | 1020020007037 A | 1/2001 |
| KR | 1020010009012 A | 2/2001 |
| KR | 1020010010743 A | 2/2001 |
| KR | 100297984 | 5/2001 |
| KR | 1020010046651 A | 6/2001 |
| KR | 1020010046652 A | 6/2001 |
| KR | 1020010066368 A | 7/2001 |
| KR | 1020010087657 A | 9/2001 |
| KR | 1020020015835 A | 3/2002 |
| KR | 1020020018883 A | 3/2002 |
| KR | 1020020027727 A | 4/2002 |
| KR | 1020020037168 A | 5/2002 |
| KR | 1020020037492 A | 5/2002 |
| KR | 1020020037493 A | 5/2002 |
| KR | 1020020046559 A | 6/2002 |
| KR | 1020020046696 A | 6/2002 |
| KR | 1020020047602 A | 6/2002 |
| KR | 100345960 | 7/2002 |
| KR | 1020020058627 A | 7/2002 |
| KR | 1020020058628 A | 7/2002 |
| KR | 1020020058629 A | 7/2002 |
| KR | 1020020058631 A | 7/2002 |
| KR | 1020020054849 A | 8/2002 |
| KR | 1020020065791 A | 8/2002 |
| KR | 10-2002-0082789 | 10/2002 |
| KR | 1020020076449 A | 10/2002 |
| WO | 02/11112 A2 | 2/2002 |

* cited by examiner

FOUR COLOR LIQUID CRYSTAL DISPLAY AND PANEL THEREFOR

RELATED APPLICATIONS

This application is a divisional of U.S. patent application Ser. No. 10/799,396, filed Mar. 12, 2004, which claims priority under 35 U.S.C. §119 to Korean Patent Application No. 200-15752, filed on Mar. 13, 2003, in the Korean Intellectual Property Office (KIPO), the contents of which are herein incorporated by reference in their entirety for all purposes.

BACKGROUND OF THE INVENTION

1. Field of the Invention

The present invention relates to a liquid crystal display and a panel therefor, and in particular, to a four color liquid crystal display.

2. Description of Related Art

Generally, a liquid crystal display (LCD) includes a liquid crystal panel assembly including two panels provided with two kinds of field generating electrodes such as pixel electrodes and a common electrode and a liquid crystal layer with dielectric anisotropy interposed therebetween. The variation of the voltage difference between the field generating electrodes, i.e., the variation in the strength of an electric field generated by the electrodes changes the transmittance of the light passing through the LCD, and thus desired images are obtained by controlling the voltage difference between the electrodes.

The LCD includes a plurality of pixels with pixel electrodes and red (R), green (G) and blue (B) color filters. The pixels are driven to perform display operation by way of the signals applied thereto through display signal lines. The signal lines include gate lines (or scanning signal lines) for carrying the scanning signals, and data lines for carrying data signals. Each pixel has a thin film transistor (TFT) connected to one of the gate lines and one of the data lines to control the data signals applied to the pixel electrode.

The usual LCD representing one dot by the three RGB colors pixels involves poor optical efficiency. Specifically, the color filters for the respective RGB pixels transmit only one thirds of the light incident thereupon, and hence, the optical efficiency is deteriorated.

In the meantime, the LCD is made by assembling one panel including the color filters and the common electrode and the other panel including the pixel electrodes and the TFTs with interposing the liquid crystal layer between the panels. When assembling the panels, the color filters and the pixel electrodes are aligned with each other and thus a predetermined alignment margin is required. Accordingly, a black matrix for blocking light leakage between the pixels is required to be widened in consideration of the alignment margin, which decreases aperture ratio.

SUMMARY OF THE INVENTION

A liquid crystal display is provided, which includes white pixels as well as red, green and blue pixels. The liquid crystal display includes a thin film transistor array panel including a plurality of color filters as well as a plurality of thin film transistors.

A thin film transistor array panel is provided, which includes: an insulating substrate; a plurality of thin film transistors formed on the substrate; a plurality of three primary color filters formed on the substrate; a plurality of first pixel electrodes formed on the color filters and connected to the thin film transistors; and a plurality of second pixel electrodes formed on the substrate and connected to the thin film transistors, wherein the second pixel electrodes do not overlap the color filters.

The panel may further include an organic insulating layer including a plurality of first portions disposed between the color filters and the first pixel electrodes and a plurality of second portions disposed under the second pixel electrodes and having thickness larger than the first portions.

Alternatively, the panel may further include a plurality of transparent filters disposed under the second pixel electrodes, which may include transparent photosensitive material or acrylic material.

The panel may further include comprising an inorganic insulating layer disposed between the color filters and the thin film transistors, between the organic insulating layer and the thin film transistors, or between the transparent filters and the thin film transistors.

The three primary colors may include red, green and blue, and the red, green and blue color filters may be located under the first pixel electrodes include third, fourth and fifth pixel electrodes According to an embodiment of the present invention, the first and the second pixel electrodes are sequentially arranged in a direction.

According to another embodiment of the present invention, the first and the second pixel electrodes are arranged in a plurality of 2×3 matrices, each 2×3 matrix having a first row including third, fifth and fourth pixel electrodes arranged in sequence and a second row including fourth, second and third pixel electrodes arranged in sequence.

According to another embodiment of the present invention, the first and the second pixel electrodes are arranged in a plurality of 2×2 matrices, each 2×2 matrix having a first row including third and fourth pixel electrodes arranged in sequence and a second row including fifth and second pixel electrodes arranged in sequence.

A liquid crystal display is provided, which includes: a first substrate; a plurality of gate lines formed on the first substrate; a gate insulating layer formed on the gate lines; a semiconductor layer formed on the gate insulating layer; an ohmic contact layer formed on the semiconductor layer; a plurality of data lines formed on the gate insulating layer and intersecting the gate lines to define a plurality of pixel areas; a first protective layer formed on the data lines; a plurality of red, green and blue color filters formed on the first protective layer; a first protective layer formed on the color filters; a plurality of pixel electrodes formed on the second protective layer, the electrodes being connected to the data lines through the semiconductor layer; a second substrate facing the first substrate; a common electrode formed on the second substrate; and a liquid crystal layer interposed between the first substrate and the second substrate, wherein the pixel areas include a plurality of white pixel areas having no color filter.

The second passivation layer may include a plurality of first portions disposed on the color filters and a plurality of second portions disposed on the white pixel areas and thicker than the first portions.

Alternatively, the liquid crystal display may further include a plurality of transparent filters formed between the first protective layer and the second protective layer and disposed in the white pixel areas.

The liquid crystal layer may have a vertical alignment with respect to the first and the second substrates, and the liquid crystal display may further include a plurality of protrusions formed on the common electrode and made of organic material, wherein the pixel electrodes have cutouts.

Alternatively, the liquid crystal layer may have a twisted alignment.

The liquid crystal display may further include a black matrix disposed on the first substrate and defining the pixel areas.

BRIEF DESCRIPTION OF THE DRAWINGS

The present invention will become more apparent by describing embodiments thereof in detail with reference to the accompanying drawings in which.

DETAILED DESCRIPTION OF PREFERRED EMBODIMENTS

Figure 1:
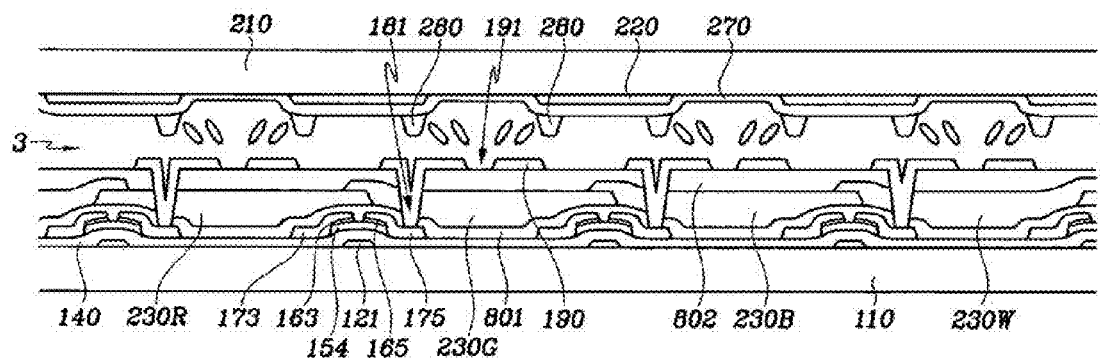
FIG. 1 is a cross sectional view of an LCD according to an embodiment of the present invention.

The present invention now will be described more fully hereinafter with reference to the accompanying drawings, in which preferred embodiments of the inventions are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Now, LCDs according to embodiments of this invention will be described in detail with reference to the accompanying drawings.

FIG. 1 is a cross sectional view of an LCD according to an embodiment of the present invention, and FIGS. 2 to 5 illustrate color filter arrangements of LCDs according to embodiments of the present invention.

As shown in FIG. 1, the LCD includes a lower panel, an upper panel facing the lower panel, and a liquid crystal layer 3 interposed between the lower panel and the upper panel and containing liquid crystal molecules aligned in a predetermined direction. The LCD may further include upper and lower polarizers (not shown), upper and lower compensation films (not shown), and a backlight unit (not shown). The liquid crystal molecules vary in their orientations under the application of electric fields. The transmittance of the light is changed depending upon the orientations of the liquid crystal molecules.

The lower panel includes a lower substrate 110 preferably made of a transparent insulating material such as glass, a plurality of thin film transistors (TFTs) formed on the lower substrate 110, a plurality of pixel electrodes 190 connected to the TFTs, preferably made of a transparent conductive material such as indium tin oxide (ITO) and indium zinc oxide (IZO), and having a plurality of cutouts 191, and a plurality of red, green, blue and transparent color filters 230R, 230G, 230B and 230W formed under the pixel electrodes 190. The red, green, blue color filters 230R, 230G and 230B may be substituted with other kind of three primary color filters.

The upper panel includes an upper substrate 210 preferably made of a transparent insulating material such as glass, a black matrix 220 defining a plurality of pixel areas arranged in a matrix and formed on the upper substrate 210, a common electrode 270 preferably made of a transparent conductive material such as ITO and IZO formed on the black matrix 220, and a plurality of protrusions 280 preferably made of organic material and formed on the common electrode.

Liquid crystal molecules in the liquid crystal layer 3 are aligned such that their major axes are perpendicular to surfaces of the substrates 110 and 210 in absence of electric field. The liquid crystal layer 3 has negative dielectric anisotropy such that the major axes of the liquid crystal molecules tend to align perpendicular to electric fields generated by the pixel electrodes 190 and the common electrode 270.

The cutouts 191 of the pixel electrode 190 and the protrusions 271 on the common electrode 270 make the electric fields have horizontal components substantially parallel to the surfaces of the substrates 110 and 210, thereby providing a plurality of domains in a pixel region of the liquid crystal layer 3. The domains may be classified into four types depending on the tilt directions of the liquid crystal molecules contained therein and they widen the viewing angle of the LCD.

The red, green, blue and transparent color filters 230R, 230G, 230B and 230W are arranged in turn. The transparent color filters 230W equally intercept or pass all the components of incident light and they may be made of organic material.

In this specification, the term "pixel" indicates a basic functional element for displaying images, which includes a pixel electrode 190, a portion of the common electrode 270 opposite the pixel electrode 190, a portion of the liquid crystal layer 3 located between the pixel electrode 190 and the corresponding portion of the common electrode 270, a TFT, and a color filter 230R, 230G, 230B or 230W. In addition, the term "pixel area" means the area occupied by a pixel. However, for convenience of description, the two terms "pixel" and "pixel area" will not be distinctly used in this specification.

Figure 2:
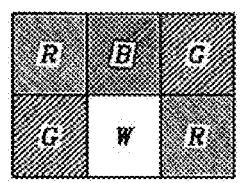
FIGS. 2 to 4 illustrate pixel arrangements for LCDs according to embodiments of the present invention.
Figure 3:
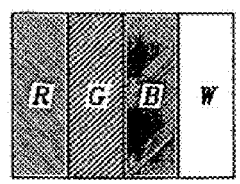
Figure 4:
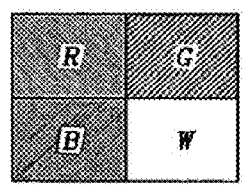

Referring to FIGS. 2-4, the sizes of the red, green, blue and white pixels areas R, G, B and W are equal, but each of the blue pixel areas B and the white pixel areas W may be smaller than each of the red pixel areas R and the green pixel areas G, for example, its size may be equal to about half of that of the red pixel area R or the green pixel area G.

Referring to FIG. 3, the numbers of the red, green, blue and white pixels areas R, G, B and W are equal. The red, green, blue and white pixel areas R, G, B and W are arranged in turn along the row direction.

Referring to FIG. 2, a 2×3 pixel matrix including identical pixels forms a dot which is a basic unit of an image, and thus the number of the blue pixels B and the white pixels W is half of that of the red pixels R and the green pixels. The first pixel row includes red, blue and green pixels arranged in sequence, and the second pixel row includes green, white and red pixels arranged in sequence.

Referring to FIG. 4, a 2×2 pixel matrix including identical pixels forms a dot, and thus the numbers of the red, green, blue and white pixels R, G, B and W are equal. The first pixel row includes red and green pixels arranged in sequence, and the second pixel row includes blue and white pixels arranged in sequence.

In these configurations, since one dot includes red, green, blue and white pixels, the optical efficiency is improved without increasing the total area of the dot.

Assume that the amount of the light entering the liquid crystal layer 3 after passing through the lower polarizer is one.

For a dot including three pixels, i.e., red, green and blue pixels, the area of each pixel is one thirds of the total area of the dot. Since the light transmittance of the color filter is one thirds, the total light transmittance of the dot is equal to $\frac{1}{3} \times \frac{1}{3} + \frac{1}{3} \times \frac{1}{3} + \frac{1}{3} \times \frac{1}{3} = \frac{1}{3} \approx 33.3\%$.

For a dot shown in FIG. 2 or FIG. 4, the area of each pixel is one fourths of the total area. Since the light transmittance of the white pixel is one, while that of the other pixels is one thirds, the total light transmittance of the dot equals to ¼×⅓+¼×⅓+¼×⅓+¼×1=½≈50%. Accordingly, the brightness is increased to be about 1.5 times compared with a conventional three-color LCD.

The area of each of the blue pixel and the white pixel is designed to be smaller than the red pixel or the green pixel for maintaining an area occupied by a dot to be fixed. Since the transmittance of the white pixel is about three times that of the other pixels, the white pixel having an area equal to only one thirds of another pixel has the transmittance equal to another pixel. In the meantime, since the variation of the amount of the blue light is relatively insensitive to a person compared with red and green light, the influence of the areal reduction on the image quality is relatively small.

Now, the lower panel of the LCD is described more in detail with reference to FIG. 1.

Referring to FIG. 1, a plurality of gate lines (not shown) extending substantially in a transverse direction and including a plurality of gate electrodes 121 are formed on an insulating substrate 110, and a gate insulating layer 140 is formed thereon.

A plurality of semiconductors 154 preferably made of amorphous silicon are formed on the gate insulating layer 140 opposite the gate electrodes 121, and a plurality of ohmic contacts 163 and 165 preferably made of amorphous silicon heavily doped with n type impurity are formed on the semiconductors 154.

A plurality of data lines (not shown) extending substantially in a transverse direction and including a plurality of source electrodes 173 and a plurality of drain electrodes 173 and 175 are formed on the ohmic contacts 163 and 165 and the gate insulating layer 140. The source and the drain electrodes 173 and 175 are disposed on the ohmic contacts 163 and 165, respectively.

A first protective layer 801 preferably made of stable material such as silicon nitride is formed on the data lines, the drain electrodes 175 and exposed portions of the semiconductors 154.

A plurality of red, greed, blue and transparent color filters 230R, 230G, 230B and 230W are formed on the first protective layer 801 and adjacent color filters 230R, 230G, 230B and 230W partly overlap each other. The transparent color filters 230W may be made of transparent photosensitive material or acrylic material.

A second protective layer 802 preferably made of organic material having good flatness characteristic is formed on the color filters 230R, 230G, 230B and 230W.

The first and the second protective layers 801 and 802 and the color filters 230R, 230G, 230B and 230W have a plurality of contact holes 181 exposing the drain electrodes 175, and a plurality of pixel electrodes 190 connected to the drain electrodes 175 through the contact holes 181 and preferably made of ITO or IZO.

A plurality of contact holes (not shown) exposing portions of the gate lines and the data lines may be provided at the gate insulating layer 140, the first and the second protective layers 801 and 802, and the color filters 230R, 230G, 230B and 230W. In addition, a plurality of contact assistants (not shown) may be provided at the contact holes to connect the gate lines and the data lines to external driving devices and to protect exposed portions of the gate lines and the data lines.

For a reflective LCD, the pixel electrodes 190 are preferably made of reflective metal such as Al or Ag.

Since the red, green, blue and transparent color filters 230R, 230G, 230B and 230W are provided under the pixel electrodes 190 in the TFT array panel, the margin for aligning the upper panel and the lower panel is reduced. Therefore, the width of the black matrix 220 can be reduced to increase the aperture ratio.

In addition, the transparent color filters 230W enable to maintain the cell gap constant, thereby preventing the disclination lines generated by the height difference in absence of the transparent color filters 230W and optimizing the response time of the liquid crystal molecules.

Figure 5:
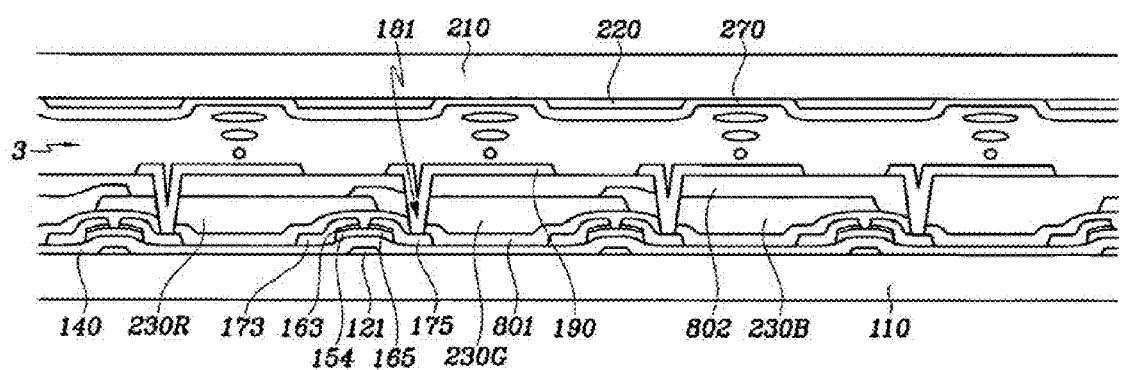
FIG. 5 is a sectional view of an LCD according to another embodiment of the present invention.

FIG. 5 is a sectional view of an LCD according to another embodiment of the present invention.

Referring to FIG. 5, an LCD according to this embodiment includes a lower panel, an upper panel facing the lower panel, a liquid crystal layer 3 interposed between the lower panel and the upper panel and containing liquid crystal molecules aligned in a twisted manner. The LCD may further include upper or lower polarizer (not shown), upper and lower compensation films (not shown), and a backlight unit (not shown). The liquid crystal molecules vary in their orientations under the application of electric fields. The transmittance of the light is changed depending upon the orientations of the liquid crystal molecules.

The lower panel includes a lower substrate 110 preferably made of an insulating material such as transparent glass, a plurality of TFTs formed on the lower substrate 110, a plurality of pixel electrodes 190 connected to the TFTs and preferably made of a transparent conductive material such as ITO and IZO, and a plurality of red, green and blue color filters 230R, 230G and 230B formed under the pixel electrodes 190.

Each TFT includes a gate electrode 121, a gate insulating layer 140, a semiconductor island 154, a pair of ohmic contacts 163 and 165, and source and drain electrodes 173 and 175, which are sequentially formed on the substrate 110, and it is covered with first and second protective layers 801 and 802. The color filters 230R, 230G and 230B are interposed between the first protective layer 801 and the second protective layer 802.

As shown in FIG. 5, the lower panel shown in FIG. 5 includes no transparent color filter. Instead, portions of the second protective layer 802 in white pixel areas have larger thickness than other portions thereof to make the height difference of the surface of the second protective layer 802 less than about 0.2 microns. Accordingly, the cell gap for all pixels is nearly uniform, and the lower panel is manufactured by relatively simple process compared with that shown in FIG. 1 since the step of forming a transparent color filter 230W is omitted.

The upper panel includes an upper substrate 210 preferably made of a transparent insulating material such as glass, a black matrix 220 defining a plurality of pixel areas arranged in a matrix, and a common electrode 270 preferably made of a transparent conductive material such as ITO and IZO.

The configurations of the white pixels shown in FIG. 1 and FIG. 5 may be exchanged. In addition, the black matrix 220 shown in FIGS. 1 and 5 may be disposed on the lower panel, preferably between the first protective layer 801 and the second protective layer 802.

Meanwhile, a plurality of photolithography steps are introduced in manufacturing the TFT array panel, and the use of a photo mask having translucent areas as well as transparent and opaque areas reduce the number of photolithography steps. Several layers having different patterns can be made by using a photoresist film having position-dependent thickness made by using the photo mask. For instance, the semiconductors 154, the ohmic contacts 163 and 165, and the source and the drain electrodes 163 and 165 are formed by using such a photoresist film, and thus, the TFT array panel can be completed using less masks compared with the case using photo masks having only transparent and opaque areas. In this case, the source and the drain electrodes 163 and 165, and the ohmic contacts have substantially the same planar shape, and the semiconductors 154 except for the channel region has substantially the same planar shape as the source and the drain electrodes 163 and 165.

As described above, the provision of the filters on the TFT array panel increases the aperture ratio, and the transparent color filters or thick portions of the protective layer enable to maintain the cell gap constant, thereby preventing the disclination lines generated by the height difference and optimizing the response time of the liquid crystal molecules.

Although preferrred embodiments in accordance with the present disclosure of invention have been described in detail herein, it should be clearly understood that many variations and/or modifications of the basic concepts herein taught which may appear to those skilled in the present art after having appreciated the present teachings will still fall within the spirit and scope of the present disclosure.

What is claimed is:

1. A thin film transistor array panel comprising:
    an insulating substrate;
    a plurality of thin film transistors formed on the substrate;
    a wavelengths discriminating layer formed above the substrate, the wavelengths discriminating layer comprising a plurality of color filters including three primary color filters;
    a plurality of first pixel electrodes formed on the wavelengths discriminating layer and connected to a first subset of the thin film transistors; and
    a plurality of second pixel electrodes formed on the substrate and connected to a second subset of the thin film transistors, wherein the second pixel electrodes do not substantially overlap the wavelengths discriminating layer; and
    a light-passing organic insulating layer including a plurality of first portions disposed between the wavelengths discriminating layer and the first pixel electrodes and a plurality of second portions disposed under the second pixel electrodes and apart from the wavelengths discriminating layer, wherein the second portions are thicker than the first portions.

2. The panel of claim 1, wherein the second portions of the organic insulating layer do not overlap any filters that define light coloration.

3. The panel of claim 2, further comprising an inorganic insulating layer disposed between the color filters and the thin film transistors.

4. The panel of claim 2, wherein the three primary colors include red, green and blue.

5. The panel of claim 1, further comprising an inorganic insulating layer disposed between the color filters and the thin film transistors or between the organic insulating layer and the thin film transistors.

6. The panel of claim 1, wherein the three primary colors include red, green and blue, the first pixel electrodes include third, fourth and fifth pixel electrodes, and the red, green and blue color filters are located under the third, fourth, and fifth pixel electrodes, respectively.

7. The panel of claim 6, wherein the first and the second pixel electrodes are sequentially arranged.

8. The panel of claim 6, wherein the first and the second pixel electrodes are arranged in a plurality of 2×3 matrices, each 2×3 matrix having a first row including third, fifth and fourth pixel electrodes arranged in sequence and a second row including fourth, second and third pixel electrodes arranged in sequence.

9. The panel of claim 6, wherein the first and the second pixel electrodes are arranged in a plurality of 2×2 matrices, each 2×2 matrix having a first row including third and fourth pixel electrodes arranged in sequence and a second row including fifth and second pixel electrodes arranged in sequence.

10. The array panel of claim 1, wherein one of the first pixel electrodes formed on a blue one of the primary color filters has a smaller area than either of two of the first electrodes formed on a red one or a green one of the primary color filters.

11. A liquid crystal display comprising:
    a first substrate;
    a plurality of gate lines formed on the first substrate;
    a gate insulating layer formed on the gate lines;
    a semiconductor layer formed on the gate insulating layer;
    an ohmic contact layer formed on the semiconductor layer;
    a plurality of data lines formed on the gate insulating layer and intersecting the gate lines to define a plurality of pixel areas;
    a first protective layer formed on the data lines;
    a wavelengths discriminating layer formed above the first protective layer, the wavelengths discriminating layer comprising a plurality of red, green and blue color filters;
    a second protective layer formed on the wavelengths discriminating layer;
    a plurality of pixel electrodes formed on the second protective layer, the electrodes being connected to the data lines through the semiconductor layer;
    a second substrate facing the first substrate;
    a common electrode formed on the second substrate; and
    a liquid crystal layer interposed between the first substrate and the second substrate,
    wherein the pixel areas include a plurality of white pixel areas, which white pixel areas do not include respective portions of the wavelengths discriminating layer, and each of the white pixel areas has one of the pixel electrodes, and
    wherein the second protective layer includes a plurality of first portions disposed on the color filters and a plurality of second portions disposed on the white pixel areas, and the second portions are thicker than the first portions.

12. The liquid crystal display of claim 11, wherein the liquid crystal layer has a vertical alignment with respect to the first and the second substrates.

13. The liquid crystal display of claim 12, further comprising a plurality of protrusions formed on the common electrode and made of organic material, wherein the pixel electrodes have cutouts.

14. The liquid crystal display of claim 11, wherein the liquid crystal layer has a twisted alignment.

15. The liquid crystal display of claim 11, further comprising a black matrix disposed on the first substrate and defining the pixel areas.

16. The liquid crystal display of claim 11, wherein the white pixel areas have a smaller area than pixel areas corresponding to the red or green color filters.

17. A liquid crystal display comprising:
    a first substrate;
    a plurality of thin film transistors formed on the first substrate;

a plurality of pixel electrodes connected to the thin film transistors, each pixel electrode having a first domain divider;

a second substrate facing the first substrate;

a common electrode formed on the second substrate;

a liquid crystal layer interposed between the first substrate and the second substrate;

wherein the pixel electrodes comprise white pixel electrodes whose activation causes display of a white color and wherein under the white pixel electrodes there is no color filter material layer, wherein the pixel electrodes further comprise red pixel electrodes whose activation causes display of a red color, wherein the pixel electrodes further comprise green pixel electrodes whose activation causes display of a green color, and wherein the pixel electrodes further comprise blue pixel electrodes whose activation causes display of a blue color, wherein the white or blue pixel electrodes have a smaller area than the red or green pixel electrodes, and an organic insulating layer including a plurality of first portions disposed under the red, blue and green pixel electrodes and including a plurality of second portions disposed under the white pixel electrodes, wherein the second portions are thicker than the first portions.

18. The liquid crystal display of claim 17, further comprising a second domain divider formed on the common electrode.

19. The liquid crystal display of claim 18, wherein the first domain divider is a cutout of the pixel electrode and the second domain divider is a protrusion formed on the common electrode, and wherein the second domain divider is made of organic material.

20. The panel of claim 1, wherein the organic insulating layer has a single layer structure in which the first and second portions are integrally formed.

21. The panel of claim 1, wherein the organic insulating layer further comprises a plurality of third portions that are connected to the first portions and the second portions and form a continuous layer along with the first portions and the second portions.

22. The panel of claim 1, wherein each of the three primary color filters partially overlaps with a differently colored other of the primary color filters.

* * * * *